United States Patent
Gregson

(10) Patent No.: US 11,129,365 B1
(45) Date of Patent: Sep. 28, 2021

(54) CATCH BAG

(71) Applicant: Heather Ann Gregson, Medford, MA (US)

(72) Inventor: Heather Ann Gregson, Medford, MA (US)

(*) Notice: Subject to any disclaimer, the term of this patent is extended or adjusted under 35 U.S.C. 154(b) by 0 days.

(21) Appl. No.: 16/929,095

(22) Filed: Jul. 14, 2020

(51) Int. Cl.
*A01K 23/00* (2006.01)

(52) U.S. Cl.
CPC .................. *A01K 23/005* (2013.01)

(58) Field of Classification Search
CPC .. A01K 23/005; A01K 1/0107; A01K 1/0125; A45C 9/00; E01H 1/1206
USPC .................. 294/1.3; 119/161; 383/4
See application file for complete search history.

(56) References Cited

U.S. PATENT DOCUMENTS

| | | | | |
|---|---|---|---|---|
| 3,475,767 A * | 11/1969 | Friesen | .................. | A61G 9/006 4/452 |
| 3,626,900 A | 12/1971 | Failla | | |
| 4,156,400 A | 5/1979 | Migdal | | |
| 4,337,812 A * | 7/1982 | Trinkner | .................. | A45C 9/00 206/541 |
| 4,646,685 A * | 3/1987 | Arenz | .................. | A01K 1/0125 119/168 |
| D291,133 S * | 7/1987 | Disanza | ............................ | 383/4 |
| 4,794,029 A * | 12/1988 | Tennant | .................... | A45C 3/10 190/1 |
| 4,799,520 A * | 1/1989 | Blackburn | ........... | A47G 33/045 206/423 |
| 4,938,607 A * | 7/1990 | Kelley | .................... | B65D 31/00 190/1 |
| 5,187,823 A * | 2/1993 | Ferguson | .................. | A45C 9/00 190/1 |
| 5,971,611 A * | 10/1999 | Rosengren | ........... | A47D 15/003 383/14 |
| 8,042,688 B2 * | 10/2011 | Parks | ...................... | A61B 50/36 206/438 |
| D668,452 S * | 10/2012 | Reeder | .......................... | D3/233 |
| 9,445,575 B2 * | 9/2016 | Ferguson | ............. | A01K 1/0157 |
| 9,681,640 B2 | 6/2017 | Miller | | |
| 2003/0005891 A1 | 1/2003 | Lu | | |
| 2008/0134992 A1 | 6/2008 | Valliant | | |

FOREIGN PATENT DOCUMENTS

| EP | 0546491 | * | 6/1993 |
|---|---|---|---|
| GB | 2423235 | * | 8/2006 |

* cited by examiner

*Primary Examiner* — Paul T Chin
(74) *Attorney, Agent, or Firm* — Volta Law Group, LLC

(57) ABSTRACT

An article of manufacture for providing a waste disposal bag for collecting pet waste within a self-contained bag is disclosed. The Catch Bag is an invention to address the process of animal feces collection and disposal. It is a flat sheet designed with drawstrings that are used to cinch the sheet, forming a bag to contain the fecal matter, eliminating direct or indirect contact with the waste and thereby removing any need to handle the waste by glove or other commonly used barrier. The sheet is positioned to catch the excrement prior to the animal defecating. After which, the drawstrings are pulled to form the bag around the waste. The bag is closed and then can be tied and easily thrown away.

5 Claims, 3 Drawing Sheets

CATCH BAG

CROSS-REFERENCE TO RELATED APPLICATION

This application claims priority to U.S. patent application Ser. No. 16/793,234, titled "The Catch Bag," and filed on Feb. 18, 2020. The entire application is incorporated herein by reference in its entirety.

TECHNICAL FIELD

This application relates in general to an article of manufacture for providing a personal protection device, and more specifically, to an article of manufacture for a waste disposal bag for collecting pet waste within a self-contained bag.

BACKGROUND

Many dog owners walk their pets a couple of times a day for both exercise as well as to relieve themselves while outside of the home. Responsible dog owners clean up after their pets that require them to pick up the pet waste and find a receptacle to dispose of it. Picking up after a dog can be a messy and unsanitary activity that may pose a health threat to the owners as well as may be difficult to do without coming into contact with the pet waste. No such all in one device is prior solutions makes it easy to collect and dispose of this pet waste.

Therefore, a need exists for a pet waste collection device that makes cleaning up after medium to x-large breed dogs easier and more sanitary. The all-in-one design allows the owner to both collect and dispose of the waste without ever having to come into indirect, often unsanitary contact with the waste, eliminating the need for scoops, handfuls of paper towels or gloves.

SUMMARY

In accordance with the present invention, the above and other problems are solved by providing an article of manufacture for a waste disposal bag for collecting pet waste within a self-contained bag according to the principles and example embodiments disclosed herein.

In one embodiment, the present invention is an article of manufacture for a waste disposal bag for collecting pet waste within a self-contained bag.

The foregoing has outlined rather broadly the features and technical advantages of the present invention in order that the detailed description of the invention that follows may be better understood. Additional features and advantages of the invention will be described hereinafter that form the subject of the claims of the invention.

It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only, and is not intended as a definition of the limits of the present invention.

BRIEF DESCRIPTION OF THE DRAWINGS

Referring now to the drawings in which like reference numbers represent corresponding parts throughout.

DETAILED DESCRIPTION

Figure 1:
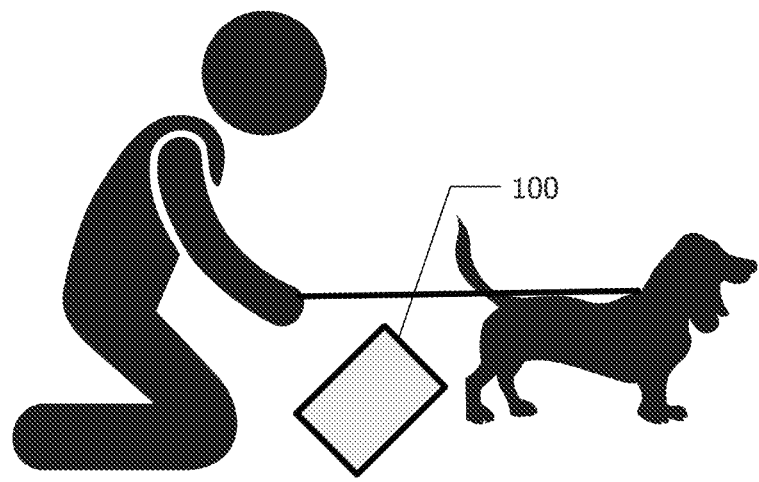
FIG. 1 illustrates an example embodiment for an article of manufacture for a waste disposal bag for collecting pet waste within a self-contained bag.

This application relates in general to an article of manufacture for providing a personal protection device, and more specifically, to an article of manufacture for a waste disposal bag for collecting pet waste within a self-contained bag.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

In describing embodiments of the present invention, the following terminology will be used. The singular forms "a," "an," and "the" include plural referents unless the context clearly dictates otherwise. Thus, for example, reference to "a needle" includes reference to one or more of such needles and "etching" includes one or more of such steps. As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. As used herein, the singular forms "a," "an," and "the" are intended to include the plural forms as well, unless the context clearly indicates otherwise.

It further will be understood that the terms "comprises," "comprising," "includes," and "including" specify the presence of stated features, steps or components, but do not preclude the presence or addition of one or more other features, steps or components. It also should be noted that in some alternative implementations, the functions and acts noted may occur out of the order noted in the figures. For example, two figures shown in succession may in fact be executed substantially concurrently or may sometimes be executed in the reverse order, depending upon the functionality and acts involved.

As used herein, the term "about" means that dimensions, sizes, formulations, parameters, shapes, and other quantities and characteristics are not and need not be exact, but may be approximated and/or larger or smaller, as desired, reflecting tolerances, conversion factors, rounding off, measurement error and the like, and other factors known to those of skill. Further, unless otherwise stated, the term "about" shall expressly include "exactly."

The terms "customer," and "user" refer to an entity, e.g. a human, using the Catch Bag according to the principles of the present invention. The term user herein refers to one or more users.

The term "invention" or "present invention" refers to the invention being applied for via the patent application with the title "The Catch Bag." Invention may be used interchangeably with bag.

In general, the present disclosure relates to an article of manufacture for providing a personal protection device. To better understand the present invention, FIG. 1 illustrates an example embodiment for an article of manufacture for providing a waste disposal bag for collecting pet waste within a self-contained bag. The Catch Bag is a fluid-resistant flat sheet that is placed under a dog before the animal defecates. When the dog is finished, the owner pulls drawstrings to close the sheet into a bag. The owner then ties the bag closed and throws it away.

Figure 2:
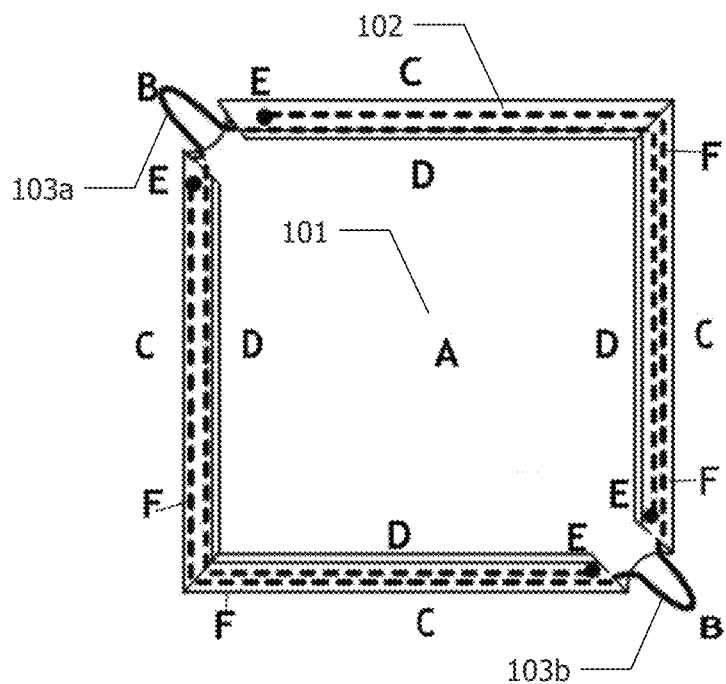
FIG. 2 illustrates another example embodiment of an article of manufacture for a waste disposal bag for collecting pet waste within a self-contained bag.

FIG. 2 illustrates another example embodiment of an article of manufacture for a waste disposal bag for collecting pet waste within a self-contained bag. The Catch Bag 100 comprises a base material A, a pair of drawstrings B, drawstring pockets C, drawstring seals D, and drawstring anchor points E. These elements are shown in FIG. 2 in a manner that creates the present invention.

A base material sheet A for the Catch Bag is a sheet of impermeable material, similar to the average plastic grocery bag or rash bag and strong enough to contain the animal waste without being damaged. While impermeability is not imperative; and there are many materials capable of performing adequately, a leak-proof barrier is preferable for containment and disposal with regard to toxicity.

The drawstrings B extend from opposing corners of the base material sheet A and are routed within the drawstring pockets C located about the outer edge of the base material sheet A. When the drawstrings B are tugged against each other, the base material sheet A assumes the shape and function of a bag to contain the contents securely. The drawstrings B are arranged from an opposing corner where they extend outward from the base material sheet A along the drawstring pockets C on each of the two opposing sides of the base material sheet A to the drawstring anchor points about the opposing corners. The drawstrings B are arranged parallel to each other within the drawstring pockets C.

The drawstring pockets C are formed by folding an outward edge of the base material sheet A back on top of itself. The initial base material sheet A is cut to create flaps to be folded over the drawstrings and sealed D to itself forming the drawstring pockets C that provide guidance to direct the course of the drawstrings B. Bonding the folded material to create the drawstring seals D may be achieved by heat, chemicals or adhesive. Another means would be threading the string though pilot holes somewhat like a shoe-string. The shape of the base material sheet A and the drawstring pockets C, through which the drawstrings B are routed, provide the function of securely closing The Catch Bag 100.

The drawstring pocket seals are created along an inner edge of the folded base material sheet A, creating the drawstring pockets C. An adhesive, glue, and similar bonding processes may be utilized to adhere the folded flap of base material to the base itself A. The drawstring seals D extend inward toward the drawstring pocket C only so far as necessary to maintain a seal between the base material surfaces. The unglued portion of the folded base material creates the drawstring pocket C through which the pair of drawstrings B is routed.

As noted above, two pairs of drawstring anchor points E are located on opposing sides of a corner opening through which the drawstrings B extend. The pair of drawstring anchor points E for a particular drawstring B is located at the opposing corner from which the particular drawstring B extends from the base material sheet A. While other arrangements exist for the drawstrings B, such as looped and double-looped, tied, glued, crossed, and woven, a preferred embodiment for the arrangement of the drawstrings B within the drawstring pockets C is shown in FIG. 2. The arrangement of the drawstrings B, however, should not be limited to the embodiment of FIG. 2 except as recited within the attached claims.

In the preferred embodiment, there are two separate drawstrings B. The openings for the two drawstrings B have to on opposing corners of the flat sheet. The anchor points E must be right before the opening of the opposing drawstring. The two drawstrings B and anchor point locations E ensure that when the drawstrings B are pulled the two opposing closed corners rise up as the flat sheet cinches into a bag. This makes sure the waste remains in the bag as it closes.

Figure 3A:
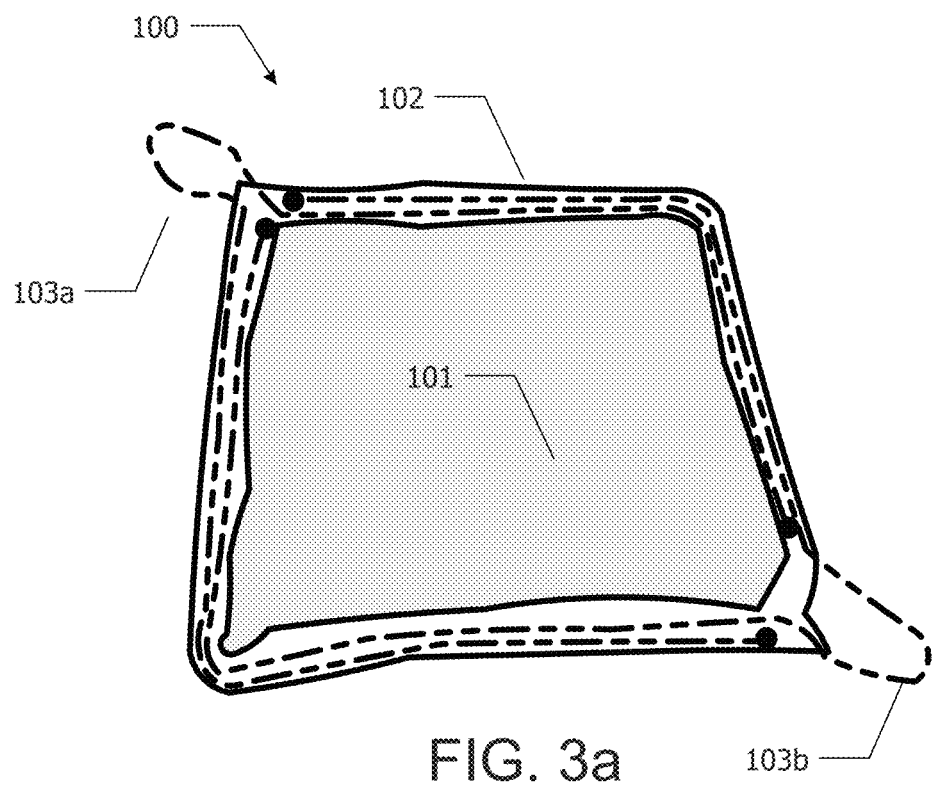
FIGS. 3a-d illustrate a third example embodiment of an article of manufacture for a waste disposal bag for collecting pet waste within a self-contained bag according to the present invention.

FIG. 3a illustrates an example embodiment of an article of manufacture for a waste disposal bag for collecting pet waste within a self-contained bag according to the present invention. The Catch Bag 100 is shown in FIG. 3 as it appears when placed onto the ground as the dog begins to have a bowel movement. The Catch Bag 100 has the base material sheet 101 placed into a position to receive the pet waste. The pair of drawstrings 103a-b extend from the base material sheet A from opposite corners.

Figure 3B:
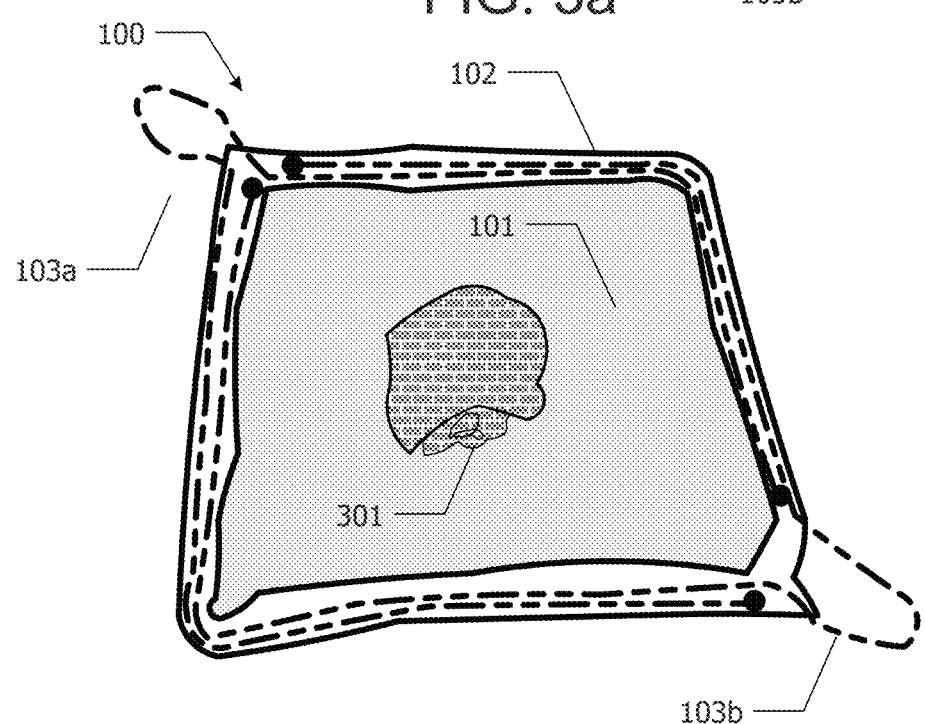
Figure 3C:
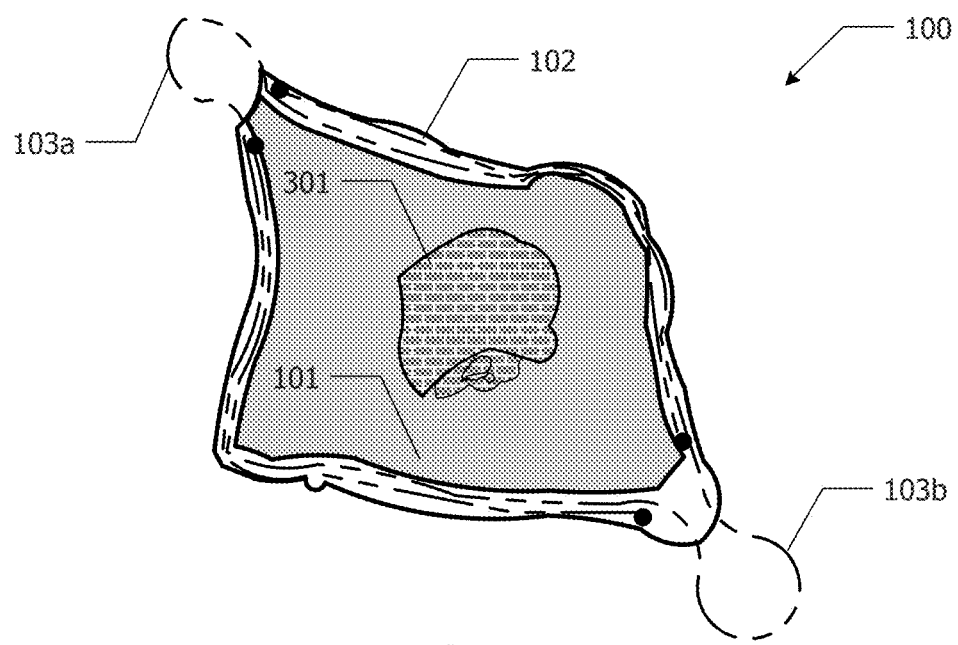

FIG. 3b illustrates The Catch Bag 100 once the dog has completed a bowel movement and the waste 301 is located on top of the base material sheet A. The user may then begin to contain the pet waste 301 within The Catch Bag 100 by pulling on the pair of drawstrings 103a-b in opposite directions as shown in FIG. 3c. As the drawstrings 103a-b are pulled apart, the drawstrings 103a-b tug the draw string pockets 102 toward the center of the base material sheet 101 and thus around the pet waste 301 as shown in FIG. 3c.

Figure 3D:
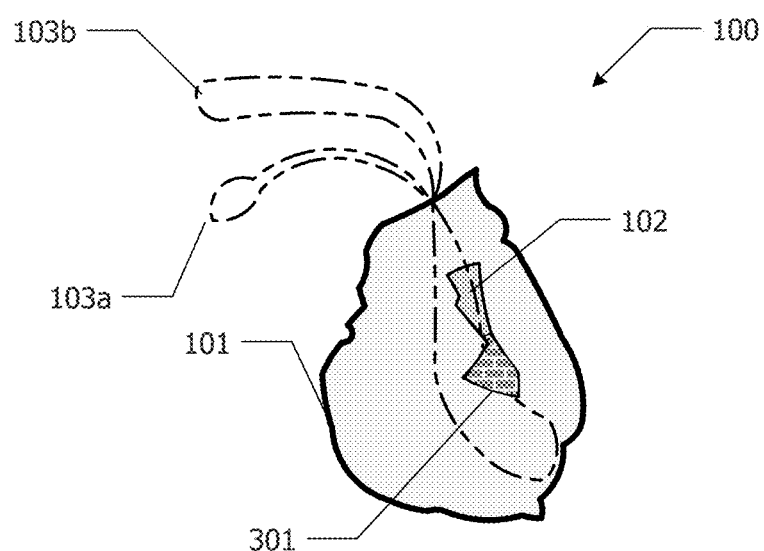

FIG. 3d illustrates The Catch Bag 100 once the drawstrings 103a-b are fully pulled from the drawstring pockets 102. The drawstring anchor points (not shown in FIG. 3a-d) are pulled toward each other until the base material sheet 101 has enclosed the pet waste 301. The edges of the base sheet material 101 that contain the drawstring pockets 102 close any opening created when the drawstrings 103a-b are pulled out. The drawstrings may be tied to each other using a knot or bow to hold the base material sheet 101 closed about the pet waste 310.

Even though particular combinations of features are recited in the present application, these combinations are not intended to limit the disclosure of the invention. In fact, many of these features may be combined in ways not specifically recited in this application. In other words, any of the features mentioned in this application may be included in this new invention in any combination or combinations to allow the functionality required for the desired operations.

No element, act, or instruction used in the present application should be construed as critical or essential to the invention unless explicitly described as such. Further, the phrase "based on" is intended to mean "based, at least in part, on" unless explicitly stated otherwise.

What is claimed:

1. An article of manufacture for a waste disposal bag for collecting pet waste within a self-contained bag, the article comprises:
   a base material having a shape approximating a rectangle;
   drawstring pockets along an outer opposing edges between a pair of opposing corners of the base material on both opposing sides of the base material;
   a pair of drawstrings extending outward from diagonally opposing corners of the base material at ends of the drawstring pockets and being routed within the drawstring pockets, each of the pair of drawstrings are located alongside each other within the opposing drawstring pockets; and
   drawstring anchor points coupling each of the ends of the pair of drawstrings to the base material about the opposing corner of the base material from which each drawstring extends outward from the corner of the base material and the end of the drawstring pockets;
   wherein pulling the drawing strings outward from the corners in which the draw strings exit the drawstring pockets cause the base material to pull inward and upward from the opposing corners in with the draw strings do not extend around any material located within the center of the base material.

2. The article of manufacture according to claim 1, wherein the base material comprises:
   a central area of base material approximating a rectangle; and
   a flap of base material that extends outward from edges of the four of the central area of the base material, the four flaps of base material folder over and back onto itself creates the drawstring pockets.

3. The article of manufacture according to claim 2, wherein the article further comprises:
   a plurality of drawstring seals coupling the four folded flaps to the base material to create the drawstring pockets.

4. The article of manufacture according to claim 1, wherein the base material is made of an impermeable material that creates a leak-proof barrier between material enclosed within the base material when the draw strings are pulled outward.

5. The article of manufacture according to claim 3, wherein the drawstring seals being created using chemicals, heating, and adhesives.

* * * * *